United States Patent
He

(10) Patent No.: US 10,007,688 B2
(45) Date of Patent: Jun. 26, 2018

(54) METHODS AND DEVICES FOR EFFICIENT FEATURE MATCHING

(71) Applicant: BlackBerry Limited, Waterloo (CA)

(72) Inventor: Dake He, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days. days.

(21) Appl. No.: 15/427,177

(22) Filed: Feb. 8, 2017

(65) Prior Publication Data

US 2017/0147620 A1 May 25, 2017

Related U.S. Application Data

(63) Continuation of application No. 14/579,297, filed on Dec. 22, 2014, now Pat. No. 9,600,524.

(51) Int. Cl.
*G06F 17/30* (2006.01)

(52) U.S. Cl.
CPC .... *G06F 17/30324* (2013.01); *G06F 17/3005* (2013.01); *G06F 17/3033* (2013.01); *G06F 17/30038* (2013.01); *G06F 17/30058* (2013.01); *G06F 17/3061* (2013.01);
(Continued)

(58) Field of Classification Search
CPC ......... G06F 17/30324; G06F 17/30038; G06F 17/3005; G06F 17/30058; G06F 17/30109; G06F 17/3033; G06F 17/30495; G06F 17/3061; G06F 17/30867; G06F 17/30964
See application file for complete search history.

(56) References Cited

U.S. PATENT DOCUMENTS

| | | | | |
|---|---|---|---|---|
| 5,710,916 A | * | 1/1998 | Barbara | ............ G06F 17/30247 |
| 7,917,299 B2 | * | 3/2011 | Buhler | .................... G06F 19/22 |
| | | | | 702/19 |

(Continued)

FOREIGN PATENT DOCUMENTS

| | | |
|---|---|---|
| EP | 2063394 | 5/2009 |
| EP | 2284796 | 2/2011 |

OTHER PUBLICATIONS

B. H. Bloom, "Space/time trade-offs in hash coding with allowable errors," Communications of the ACM, pp. 422-426, 1970.
(Continued)

*Primary Examiner* — Noosha Arjomandi
(74) *Attorney, Agent, or Firm* — Rowand LLP

(57) ABSTRACT

A method of non-identical feature matching in a search system, the search system having a set of data points. The method includes determining a threshold error and expanding the set to create an expanded set by including all data points as data elements of the expanded set and, for every data point in the set, finding all data elements within an error distance of that data point and adding those found data elements to the expanded set, wherein the error distance is a function of the threshold error. The method includes creating a summary representation of the expanded set by constructing a binary array using a plurality of hash functions as a bloom filter. The method may further include receiving a query and applying the plurality of hash functions to the query to determine, from the binary array, whether the query matches one of the data elements in the expanded set and, if so, outputting a match.

19 Claims, 4 Drawing Sheets

(52) U.S. Cl.
CPC .. *G06F 17/30109* (2013.01); *G06F 17/30495* (2013.01); *G06F 17/30867* (2013.01); *G06F 17/30964* (2013.01)

(56) References Cited

U.S. PATENT DOCUMENTS

| | | | | |
|---|---|---|---|---|
| 8,639,875 | B1* | 1/2014 | Estan | G06F 12/00 707/769 |
| 9,275,404 | B2* | 3/2016 | Keerthi | G06Q 30/0282 |
| 9,344,441 | B2* | 5/2016 | Kohout | H04L 63/1425 |
| 9,348,920 | B1* | 5/2016 | Kesin | G06F 17/30554 |
| 2004/0153444 | A1* | 8/2004 | Senders | G06F 17/30687 |
| 2006/0282465 | A1* | 12/2006 | Sharma | G06F 17/30864 |
| 2010/0287196 | A1* | 11/2010 | Shields | G06F 17/30781 707/769 |
| 2010/0332471 | A1* | 12/2010 | Cypher | G06F 9/467 707/736 |
| 2011/0029508 | A1* | 2/2011 | Al-Omari | G06F 17/30433 707/718 |
| 2013/0339472 | A1* | 12/2013 | Ruellan | H04L 67/2842 709/214 |
| 2014/0372956 | A1* | 12/2014 | Bisca | G06F 17/30958 715/848 |
| 2015/0081733 | A1* | 3/2015 | Yamada | G06F 17/30286 707/770 |
| 2015/0088927 | A1* | 3/2015 | Sarrazin | G06Q 10/109 707/769 |
| 2016/0350426 | A1* | 12/2016 | Wu | G06F 17/3064 |

OTHER PUBLICATIONS

D. G. Lowe."Object recognition from local scale-invariant features," Proceedings of the International Conference on Computer Vision 2. pp. 1150-1157, 1999.
A. Border and M. Mitzenmacher, "Network applications of bloom filters: A survey," Internet mathematics, pp. 485-509, 2011.
M. Mitzenmacher, "Compressed bloom filters," IEEE/ACM Trans. Networking, pp. 604-612, 2002.
B. Fan, D. G. Anderson, and M. Kaminsky, "Cuckoo filter: Better than bloom," USENIX ;login:, Aug. 2013.
L. Fan, P. Cao, J. Almeida, and A. Z. Broder. "Summary cache: a scalable wide-area Web cache sharing protocol," IEEE/ACM Trans. on Networking, pp. 281-293, 2000.
S. C. Draper, A. Khisti, E. Martinian, A. Vetro, and J. S. Yedidia, "Secure storage of fingerprint biometrics using Slepian-Wolf codes," in Proc. IEEE Information Theory and Applications Workshop (ITA), 2007.
D.-K. He, A. Jagmohan, and L. Lu, "Secure collaboration using Slepian-Wolf codes," in Proc. ICIP, 2008.
R. Schnell, T. Bachteler, and J. Reiher, "Privacy-preserving record linkage using Bloom filters," BMC Medical Informatics & Decision Making, 2009.
D. Pau, G. Cordara, M. Bober, S. Paschalakis, K. Iwamoto, G. Francini, V. Chandrasekhar, and G. Takacs, "White paper on compact descriptors for visual search," MPEG2013/N13951, Apr. 2013.
ISO/IEC DIS 15938-13, Information technology—Multimedia content description interface—Part 13: Compact descriptors for visual search, 2014.
ISO/IEC/JTC1/SC291WG11/N14509, "Compact descriptors for video analysis (CDVA)," Apr. 2014.
L. Pauleve, H. Jegou, and L. Amsaleg, "Locality sensitive hashing: a comparison of hash function types and querying mechanisms," Pattern Recognition Letters, pp. 1348-1358, 2010.
EPO, Extended European Search Report relating to Application No. 15201545.9, dated Apr. 14, 2016.
Yu et al.: "Locality-Sensitive Bloom Filter for Approximate Membership Query", IEEE Transactions on Computers, vol. 51, No. 6, Jun. 1, 2012, XP011442089.
Lim et al.: "Reducing False Positives of a Bloom Filter using Cross-Checking Bloom Filters", Applied Mathematics & Information Sciences, vol. 8, No. 4, Jul. 1, 2014, XP055261960.
Anonymous: "Nearest neighbor search—Wikipedia, the free ecnyclopedia", Sep. 5, 2014, XP055172771.
EPO, Communication pursuant to Article 94(3) EPC, dated Jun. 30, 2017, relating to application No. 15201545.9.
EPO, EP Summons to Attend Oral Proceedings relating to EP application No. 15201545.9, dated Feb. 21, 2018.
Yu Hua et al.: "Locality-Sensitive Bloom Filter for Approximate Membership Query", IEEE Transactions on Computers, IEEE Service Center, Los Alamitos, CA, US, vol. 61, No. 6, Jun. 1, 2012, pp. 817-830, XP011442089.

* cited by examiner

US 10,007,688 B2

METHODS AND DEVICES FOR EFFICIENT FEATURE MATCHING

CROSS-REFERENCE TO RELATED APPLICATIONS

The present application is a continuation of U.S. patent application Ser. No. 14/579,297 filed Dec. 22, 2014, the contents of which are hereby incorporated by reference.

FIELD

The present application generally relates to searching for information and, in particular, to searching for close, but non-identical, matches in large sets of data.

BACKGROUND

Searching for data that matches a query takes place in a large variety of circumstances. For example, a word-match search may be used to identify occurrences of a keyword in a document, a database of documents, or in online internet webpage searching. Login verification may involve searching for a match in a set of login credentials. Object recognition may involve searching through a database or collection of objects for a matching object. All these examples can be generalized as a two-step process: (1) construct the set S and its representation, typically offline, and (2) compute f(x), where x is the query and f(x) is the result according to:

$$f(x) = \begin{cases} 0 & x \notin S \\ 1 & x \in S \end{cases}$$

The second step—membership testing—is typically done "online", often in real-time.

Many modern searches are not necessarily based on perfect matches. For example, object or feature recognition in images or video cannot typically rely on perfect matching. For example, some facial recognition processes may want to identify close matches, as opposed to perfect matches. Fingerprint analysis is another area in which exact matches are unlikely. Instead, in these "imperfect" match searches, a distance-based matching may be used. The term "distance-based" is used in the general sense of a scalar metric d(x, y) where x is a query and y is a candidate element of S. In some cases, the metric d(x, y) may be the Euclidean distance, but other more complex metrics may be used.

With distance-based matching, the search result, f(x) is based on whether there is an element(s) of the set S within a threshold distance $\delta$ of the query x. The search for the closest element of S subject may be described as:

$$d(x, S) = \min_{y \in S} d(x, y)$$

With the constraint of the threshold distance, the search may be characterized as:

$$f(x) = \begin{cases} 0 & d(x, S) > \delta \\ 1 & d(x, S) \leq \delta \end{cases}$$

It will be appreciated that distance-based searching is significantly more costly (in terms of computing resources) and time-consuming than simple membership testing. As a result, imperfect match searching can be difficult to implement in real-time online searching, particularly where the metric d(x, y) is complex.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
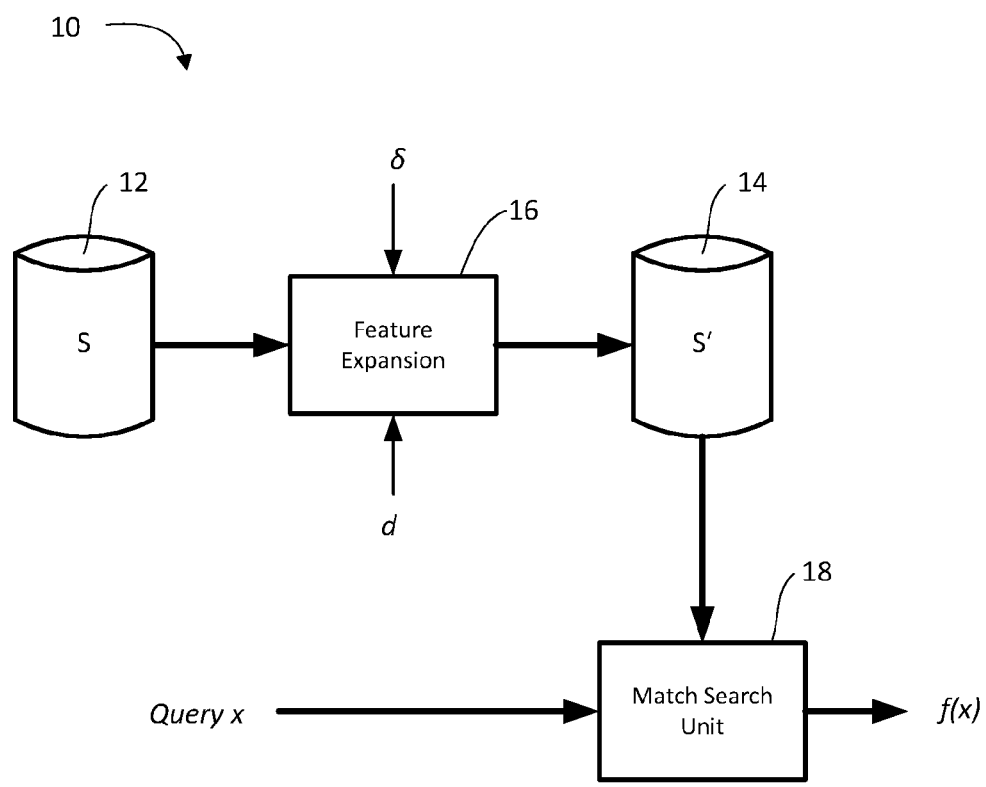
FIG. 1 shows a simplified block diagram of a search system using feature expansion.

In one aspect, the present application describes a method of non-identical feature matching in a search system, the search system having a set of data points. The method includes determining a threshold error; expanding the set to create an expanded set by, initializing the expanded set to include all data points from the set as data elements of the expanded set, and, for every data point in the set, finding all data elements within an error distance of that data point and adding those found data elements to the expanded set, wherein the error distance is a function of the threshold error; creating a summary representation of the expanded set by constructing a binary array using a plurality of hash functions as a bloom filter; receiving a query; and applying the plurality of hash functions to the query to determine, from the binary array, whether the query matches one of the data elements in the expanded set and, if so, outputting a match.

In another aspect, the present application describes a method that includes determining a threshold error; expanding the set to create an expanded set by, initializing the expanded set to include all data points from the set as data elements of the expanded set, and, for every data point in the set, finding all data elements within an error distance of that data point and adding those found data elements to the expanded set, wherein the error distance is a function of the threshold error; creating a summary representation of the expanded set by constructing a binary array using a plurality of hash functions as a bloom filter; and transmitting the binary array to a remote device for use in conducting a feature search.

In yet another aspect, the present application describes a search system for non-identical feature matching. The search system includes one or more processors; memory storing a set of data points and a threshold error; and processor-executable search instructions that, when executed by the one or more processors cause the one or more processors to expand the set to create an expanded set by, initializing the expanded set to include all data points from the set as data elements of the expanded set, finding all data elements within an error distance of that data point and adding those found data elements to the expanded set, wherein the error distance is a function of the threshold error, create a summary representation of the expanded set by constructing a binary array using a plurality of hash functions as a bloom filter, and store the summary representation for conducting feature matching.

In yet another aspect, the present application describes a method of constructing a search system, the search system having a set of data points. The method includes determining a threshold error; expanding the set to create an expanded set by, initializing the expanded set to include all data points from the set as data elements of the expanded set, and for every data point in the set, finding all data elements within an error distance of that data point and adding those found data elements to the expanded set, wherein the error distance is a function of the threshold error; creating a summary representation of the expanded set by constructing a binary array using a plurality of hash functions as a bloom filter; and storing the binary array in the search system as the summary representation of the expanded set for evaluating future search queries.

In a further aspect, the search system includes instructions that, when executed, cause the one or more processors to receive a query and apply the plurality of hash functions to the query to determine, from the binary array, whether the query matches one of the data elements in the expanded set and, if so, outputting a match.

In another aspect, the search system includes instructions that, when executed, cause the one or more processors to receive a request from a remote device and, in response, to transmit the binary array to the remote device to enable local search on the remote device.

In yet a further aspect, the present application describes non-transitory computer-readable media storing computer-executable program instructions which, when executed, configured a processor to perform the described methods.

Other aspects and features of the present application will be understood by those of ordinary skill in the art from a review of the following description of examples in conjunction with the accompanying figures.

In the description that follows, reference will be made to "distance-based" searching. This may also or alternatively be termed "non-matched" or "imperfect" searching. The term "distance-based" does not necessarily imply that the metric $d(x, y)$ is a Euclidean distance measurement. The metric $d(x, y)$ may, in some examples, include L1 distance, L2 distance, editing distance (for strings), earth moving distance, KL divergence, the structure similarity (SSIM), or other measurements of similarity suitable for a particular set of data. All such possible understandings of similarity and metrics for measuring similarity are understood to be within the scope of the term "distance-based" searching and the methods described herein.

As noted above, distance-based searching attempts to evaluate the function $f(x)$ for a given threshold value or error $\delta$:

$$f(x) = \begin{cases} 0 & d(x, S) > \delta \\ 1 & d(x, S) \leq \delta \end{cases}$$

where the distance measurement is:

$$d(x, S) = \min_{y \in S} d(x, y)$$

Note that $f(x)$ may be 1 (i.e. a positive result is found in S) even where the query x is not itself a member of S. This means that classical bloom filter approaches to reducing S to a binary string using a plurality of hash functions is not possible because the distance metric must be evaluated at the membership testing stage. Existing approaches to this problem include quantization of x and S and algorithms like the k-d tree algorithm for nearest neighbor searching. However, these techniques each suffer from some drawbacks.

It can be difficult to find an ideal quantizer for a large set S, particularly if the metric $d(x, y)$ is complex to evaluate. Even if the quantizer is not ideal, but approximates the distance metric well enough, it may be fairly complicated to describe and apply. A simple quantizer may not approximate the metric well enough and may result in a number of false positives.

A k-d tree is a data structure often used for search in a multidimensional space. Though the k-d tree algorithm provides a systematic way to perform the nearest-neighbour search, its computational complexity is much higher than that of bloom filters. Furthermore, since the k-d tree algorithm performs or approximates the nearest-neighbour search, the returned results might not satisfy the distance constraint $d(x, y) \leq \delta$. As such, additional checking might be necessary to reject these results.

The present application provides, in one aspect, a distance-based searching system and method that uses feature expansion to effectively move the distance-based searching into the set representation operation instead of the membership testing operation. This allows simplification of the membership testing operation to a perfect matching operation, thereby reducing complexity and improving speed at that stage of evaluating a query.

Reference is now made to FIG. 1, which shows a simplified block diagram of an example search system 10. The search system 10 includes memory 12, 14, a feature expansion module 16, and a match search unit 18. The memory 12 stores a set S of data points. The feature expansion module 16 obtains the set of data points from the memory 12 and applies the feature expansion operation described below to generate expanded set S', which may then be stored in memory 14. The match search unit 18 attempts to identify a match for the query x in the expanded set S', with the result being shown as f(x).

The search system 10 may be implemented on a suitably-programmed general purpose computing device executing software for carrying out the feature expansion, storage, and matching operations described below. In some cases, the software may be executed by two or more processors. The search system 10 may be implemented wholly or partly on a server, a mobile device, a personal computer, a tablet, or other processing device. In some cases, the memory 12 and the memory 14 are implemented using the same physical memory or hard disk, but in some cases they are different logical or physical memory elements and may, in some embodiments, be in different devices. In some cases, the feature expansion module 16 is implemented on a server or other device having significant processing capacity to carry out the feature expansion analysis, and the expanded set or a representation thereof is transmitted to another device, such as a mobile device, tablet, or computer, which implements the match search unit 18.

The feature expansion operation expands the original set of data points, S, to an expanded set S', such that any x with $f(x)=1$ is a member of S'. The expansion is based upon a distance metric $d(x, y)$ and a threshold error value $\delta$. The expanded set S' is first initialized as containing all elements s of the set S. In general, for every element s in S, the distance metric is applied to find all values v within the threshold error δ of the element s. All those values v are then appended or added to the expanded set S'. In this manner, the expanded set S' is generated to include all elements within a neighborhood (defined by the distance metric and the threshold error) of each element s in S.

Figure 2:
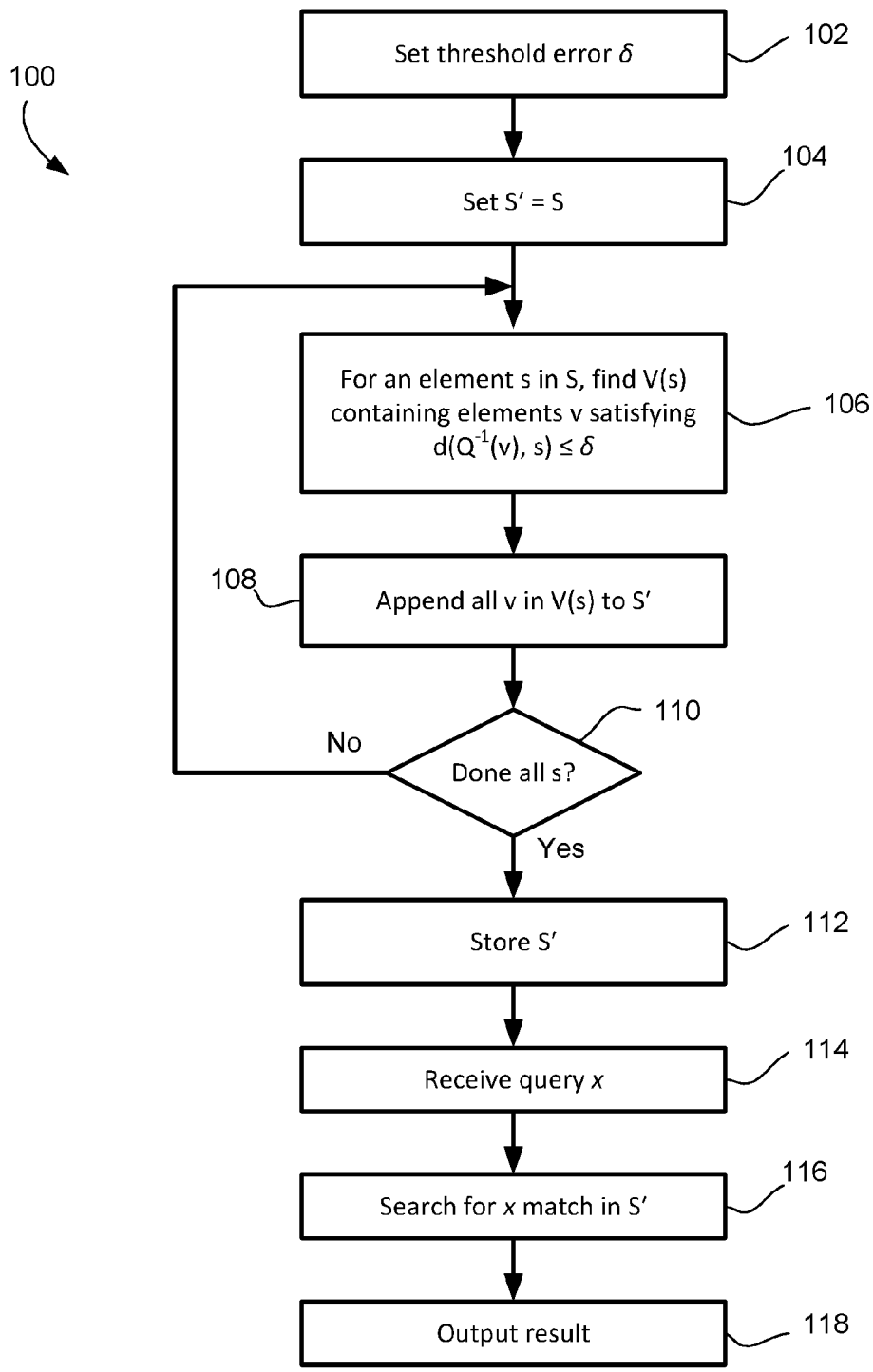
FIG. 2 shows, in flowchart form, an example process for searching using feature expansion.

Referring now to FIG. 2, an example search process 100 is shown in flowchart form. The search process 100 begins with establishing a threshold error δ, as indicated by operation 102. As noted above, the threshold error δ may a scalar value indicative of the degree of similarity required between a query and its imperfect match. It effectively defines the size of the neighborhood around each element s in the expansion operation and, thus, the scope of expansion. The distance metric d(x, y) is also known at this stage and is selected based on the nature of the data in S and the suitability of the metric in evaluating similarity with data of that nature.

In operation 104, an expanded set S' is initialized and is first populated with all the elements of S. That is, S' is initially set equal to S. Then, in operation 106, for an element s in S, a neighborhood V(s) containing elements v is determined, such that each element v in V(s) satisfies the condition $d(v, s) \leq \delta$. V(s) is sometimes called the δ-neighborhood of s (defined by d). In operation 108, all elements v falling in the neighborhood V(s) are added to the expanded set S'. As indicated by operation 110, operations 106 and 108 are repeated for all s in S. Once all s have been "expanded", then the expanded set S' is stored, as shown by operation 112. Operations 102 to 112 may be carried out "offline" in some embodiments. In other embodiments, the operations 102 to 112 may be carried out "online" based on a specified threshold error δ during an initialization of a session during which later real-time queries will be processed.

In operation 114, a query x is received. In some cases, the query may be received in another form, such as a text string or image or other input, and may be preprocessed to produce the query x. In operation 116 the query is carried out by searching for a match for x in the expanded set S'. The search result, e.g. f(x), is output in operation 118. The output of the search result may include outputting whether a match was found (i.e. f(x)) and/or the matching element from S', or a pointer to that element.

Operations 114-118 may be performed online in some embodiments. In some examples, operations 114-118 are carried out in real-time or near-real-time.

It will be appreciated that the process 100 trades off computational and storage demands in the set representation stage for improved computational speed at the membership testing stage.

Note that it is not necessary to require that every x in S' satisfy the distance constraint in operation 106. Such relaxation in constraining x might be leveraged to control complexity in constructing S', at the cost of false positives. That is, S' is allowed to include v such that $d(v, S) > \delta$, i.e., v is not in the δ-neighborhood of any member in S, if the inclusion of v simplifies the construction of S'. For example, when the function d is complex or difficult to evaluate, e.g. the editing distance function, one might still want to construct S' by using a simpler distance function like the L1 or L2 distance function. Due to the difference between the function d that is used to define the δ-neighborhood and the function that is used to construct S', S' might contain members v such that $d(v, S) > \delta$.

In some embodiments, where storage complexity is not of central concern, S' can be represented by using a hash table to reduce the probability of false positives, instead of using a bloom filter. In these cases, false positives are caused by collisions of hash values computed by the hash function selected.

In some embodiments, the original set S and the expanded set S' are both stored in memory and made available so that the search can be done either by distance computation against S or by membership testing against S', thus providing backward compatibility to legacy devices which do not understand S' or devices choose not to use S'.

In some cases, quantization may be used in conjunction with feature expansion. In one example, to avoid excessive increase in storage complexity due to feature expansion, a simple quantizer Q may be used on S prior to feature expansion, and on x prior to membership testing in S'.

To provide an example, consider a set of eight SIFT descriptors extracted from an image. The set is denoted by $S = \{s_0, s_1, \ldots, s_7\}$. Note that each SIFT descriptor is a length-128 vector of non-negative real numbers. Let x denote a query SIFT descriptor. The search process is to determine whether x is close to any of the descriptors in S. "Closeness" in this case may be measured by Euclidean distance, e.g.:

$$d(x, y) = \sqrt{\sum_{j=0}^{127} (x_j - y_j)^2}.$$

In this example, the uniform scalar quantizer Q with step size q may be used when initializing S' by initializing S' as $\{Q(s_0), Q(s_1), Q(s_2), \ldots, Q(s_7)\}$. The elements of S' may be denoted $s'_i$ with $i = 0, \ldots, 7$. For each $s'_i$, the neighborhood $V(s'_i)$ may be given by:

$$V(s'_i) \triangleq \{s : s_j \in \mathbb{Z}^+ \cup \{0\} \text{ and } |s_j - s'_{i,j}| < \delta + q \, \forall j\}$$

In the above expression, $\mathbb{Z}^+$ denotes the set of all non-negative integers, and $Q^{-1}$ denotes the inverse function of Q. For every $s \in V(s'_i)$, append s to the end of S' if $d(Q^{-1}(s), s_i) \leq \delta$ and s is not already a member of S'. Denote $\tilde{x} = Q^{-1}(\hat{x})$. Then:

$$\tilde{x}_j = q\hat{x}_j + \alpha q, \text{ where } \alpha \in [0,1] \text{ is a constant}$$

A possible choice of α is 0.5, for example.

More generically, prior to operation 106 in the process 100, a quantizer Q may be selected (if desired). The quantizer Q may be identity mapping, i.e. $Q(v) = v$ for all v. One mechanism for selecting a quantizer is to examine the cardinality of V(s) and select a Q such that the number of elements in V(s) does not exceed a given threshold or limit. When carrying out operation 106, the neighborhood V(s) then includes features that satisfy the condition $d(Q^{-1}(v), s) \leq \delta$. An alternative (simplified) is to include all v such that $\|s - Q^{-1}(v)\|_\infty \leq \delta$.

It will be appreciated that quantization is a lossy process. The loss of original information likely would complicate distance-based matching in the query process. For example, a scalar symmetric quantizer with step size 3 will map 2.5 to 0, and 3 to 6. If the threshold δ is 2, then a match between 2.5 and 3 might be missed after quantization (0 and 6, respectively). In contrast, the present solution based on feature expansion is well suited to leverage quantization in the design. Since feature expansion is performed during the representation step, all the information is available and can thus be used in determining what should be included in the expanded set. As an illustrative example, suppose that the threshold δ is 2. In the above example, after mapping 2.5 to 0 by using the same quantizer as described above, one might decide to include the next value 6 in the expanded set since the original 2.5 is close to the quantization boundary. In another example, where the original is 0.5, one might decide not to include the next value 6 in the expanded set since the distance between the original 0.5 and the quantization boundary is greater than the value 2 of the threshold $\delta$.

It will be appreciated that knowledge of the threshold error $\delta$ is assumed in the feature expansion operation. When the expanded set S' is generated, the expansion is based on a specific threshold error $\delta$ that determines what errors/distortions are to be tolerated and what are not. In some applications, such as, for example, fingerprint authentication, the threshold error $\delta$ may be a known fixed quantity. However, in some other applications, it may be desirable to allow for a selectable or flexible tolerance level. For example, in some applications, a query might contain information specifying the threshold error $\delta$.

One mechanism for accommodating flexible threshold error selection, is to determine if the level $\delta$ associated with a specific query is greater than the level used in constructing S' through feature expansion. If yes, then perform ordinary distance calculation against the original feature set S; otherwise, use membership testing against S'.

Another mechanism is to generate a hierarchy of expanded sets $S^{(0)} \subset S^{(1)} \subset S^{(2)} \ldots$. These sets are constructed through feature expansion with $\delta^{(0)} < \delta^{(1)} < \delta^{(2)} \ldots$, respectively, where $S^{(0)} = S$ and $\delta^{(0)} = 0$. When a query is received with a specified $\delta$, the smallest set $S^{(j)}$ with $\delta^{(j)} \geq \delta$ is used for membership testing. If no such set exists, then perform distance calculation against S.

In some embodiments, after expanding S to S', a bloom filter may be used to represent S' for space efficiency and efficient membership testing, at the cost of some false positive errors. The false positive probability introduced by the bloom filter (in addition to any resulting from the expansion process) is tunable as a design parameter of the bloom filter used.

To further reduce the storage complexity, in some embodiments alternatives to the bloom filter may be used, such as a compressed bloom filter or a cuckoo filter. Other variants of bloom filters (e.g. counting bloom filters) may be used to address application requirements like dynamic S, deletion of elements in S, scalability, etc.

In some embodiments, the set S' might be compactly represented by using a dimension reduction linear transform. Suppose that S' is written as a L×N matrix, where each of the N columns corresponds to a member in S' of length L. Let $\Phi$ denote a K×L matrix, where K is a small number compared to L. Then the compact representation of S' can be derived as R=$\Phi$S'. Note that R is a K×N matrix. Suppose that R is from a finite field GF(2M), where M is a positive integer. Then R can be regarded as an implementation of a bloom filter with parameters (M, K) by using a linear transform. Let s be a member in S' and let r=$\Phi$s. In some embodiments, R can be coded and transmitted by coding and transmitting the compact representation r of s by using arithmetic coding, Huffman coding, enumerative coding, or other lossless coding methods.

Instead of coding and transmitting R, in some embodiments a compact representation rx=$\Phi$x of the query x is coded and transmitted by using a method similar to code and transmit a column in R=$\Phi$S' above, where $\Phi$ is a K×L matrix as above. In these embodiments, rx is checked against R to verify the membership of x in S'. If rx is a column in R, then x is declared a member in S'. Furthermore, x can be reconstructed from rx and S by using constrained programming. In embodiments where the distance function d is the L1 distance function, then x can be reconstructed by using linear programming, where the d(x, S)≤$\delta$ can be regarded as linear constraints. In embodiments where the distance function d is the L2 distance function, then x can be reconstructed by using quadratic programming.

Furthermore, to mitigate the false positive errors or to balance between the storage complexity and computational complexity, a hybrid system that makes use of both bloom filters for membership testing and nearest-neighbor search (e.g. based on the k-d tree algorithm) after successful membership testing may be used.

Figure 3:
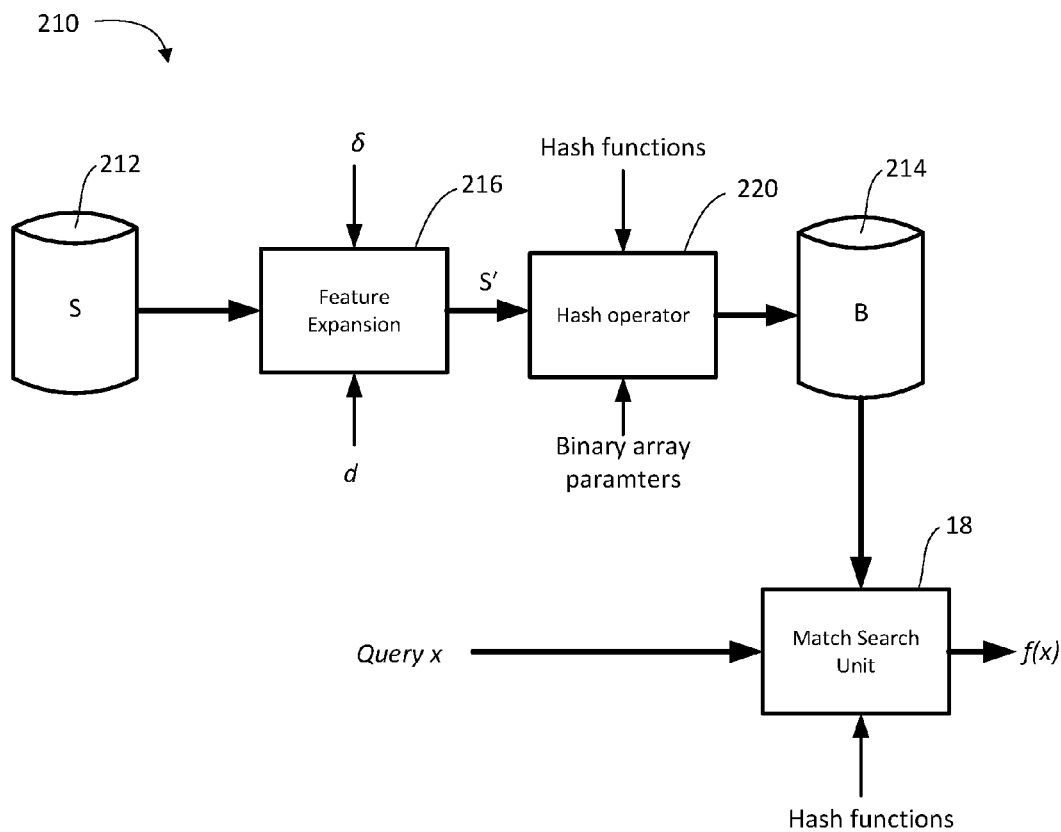
FIG. 3 shows a simplified block diagram of a search system with summary representation.
Figure 4:
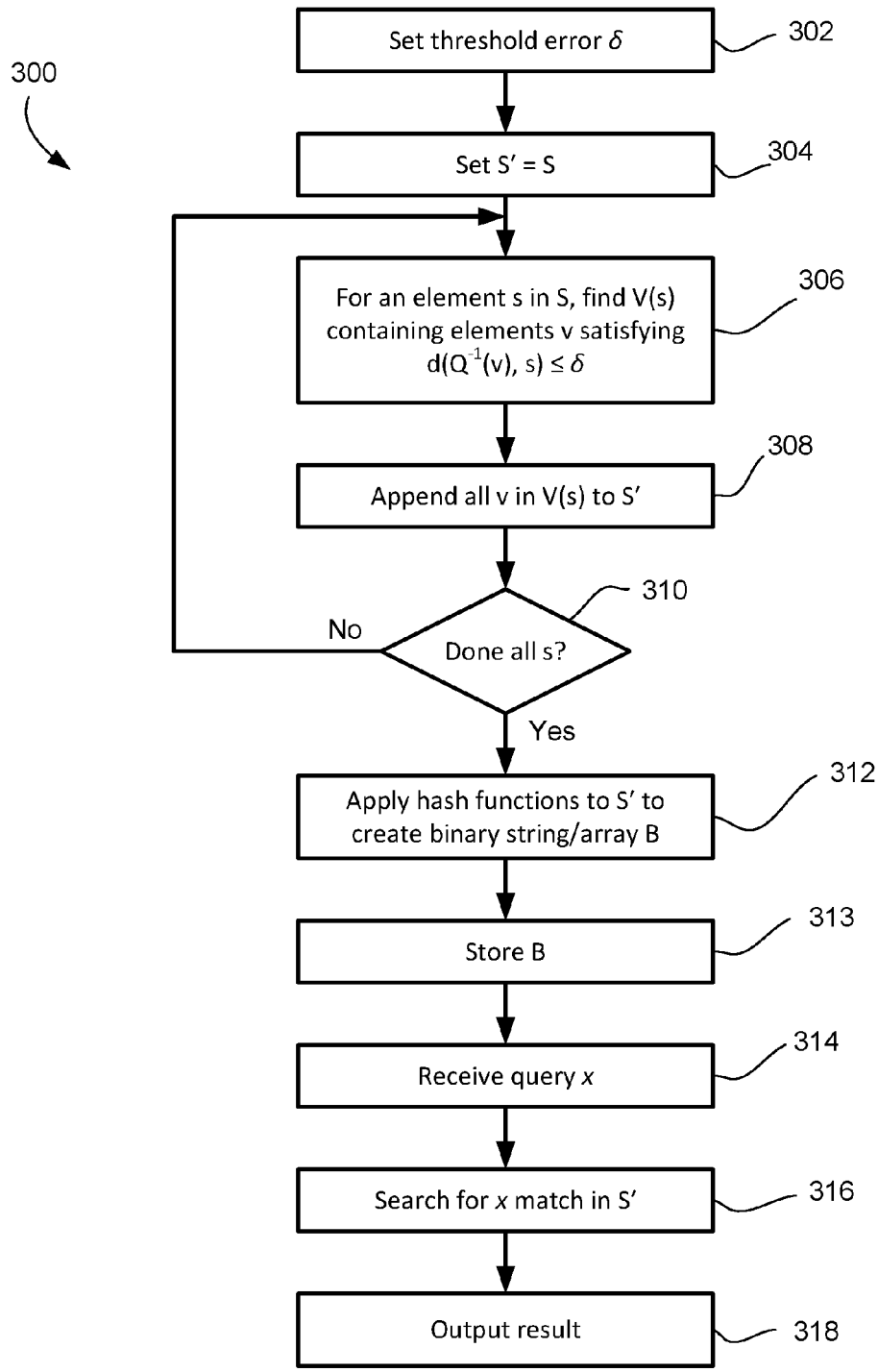
FIG. 4 shows, in flowchart form, an example process for searching using summary representation of an expanded set.

Reference is now made to FIGS. 3 and 4. FIG. 3 shows a block diagram of a simplified block diagram of an example search system 210. The search system 210 includes memory 212, 214, a feature expansion module 216, a hash operator 220, and a match search unit 218. The memory 212 stores a set S of data points. The feature expansion module 216 obtains the set of data points from the memory 212 and applies the feature expansion operation to generate expanded set S'. The hash operator 220 uses a set of hash functions to generate a binary string by applying the hash functions to the elements of the expanded set S'. The hash operator outputs the binary string, B, which may then be stored in memory 214.

The match search unit 218 receives the query x. It then applies the same set of hash functions to the query x as were used in the hash operator 220. The match search unit 218 then compares the hashed value of x to the binary string B to attempt to identify a match for the query x in the expanded set S'. The result is shown as f(x).

FIG. 4 shows, in flowchart form, an example search process 300 that uses a bloom filter to reduce storage requirements for the expanded set. The threshold error $\delta$ is determined, as indicated by operation 302. In operation 304, an expanded set S' is initialized and is first populated with all the elements of S. Then, in operation 306, for an element s in S, a neighborhood V(s) containing elements v is determined, such that each element v in V(s) satisfies the condition d(v, s)≤$\delta$. In operation 308, all elements v falling in the neighborhood V(s) are added to the expanded set S'. As indicated by operation 310, operations 306 and 308 are repeated for all s in S. Once all s have been "expanded", then a set of hash functions applied to each element of the expanded set S' so as to generate a binary string B, as shown by operation 312. The binary string B is then stored in memory in operation 313.

In operation 314, a query x is received. In operation 316 the has functions are applied to the query and the result is compared with the binary string B in order to assess whether there is likely a match for the query x in the expanded set S' (there is a possibility of a false positive result due to the reliance upon hash functions). The search result, e.g. f(x), is output in operation 318. The output of the search result may include outputting whether a match was found (i.e. f(x)) and/or the matching element from S', or a pointer to that element.

Summary Representation

The binary string B may be referred to as a "summary representation" in some implementations. For example, in the case of feature-based visual search of images, the image may be represented by a set of features. In order to determine whether a feature x appears in an image (or, rather, in the set of S features extracted from the image), a "summary representation" of the features may accompany the image. In one embodiment, the summary representation is part of the bitstream encoding the features extracted from an image. In another embodiment, the summary representation is a stand-alone record representing an image in a database.

In one example, this summary representation takes form as a binary array of length m, which is populated by the extracted features through k hash functions as in a bloom filter, and with the maximum allowable distance δ in cases where approximate matching and feature expansion is used. Suppose that the total number of features in S' is n (after expansion), the parameters (m, k) are selected to meet the requirement that the false positive does not exceed a certain threshold ε, which may be expressed as:

$$(1-e^{-kn/m})^k \leq \varepsilon.$$

In one embodiment, k may be set to $$k = \frac{m}{n}\ln 2,$$

which is justified in the literature regarding bloom filters. For image search, k can be selected from a finite set, e.g. {2, 4, 8, 16} or {2, 3, 4, 5, 6, 7, 8, ..., 16}, to meet a target threshold ε.

To provide an illustrative example, suppose that 4 features {$s_0$, $s_1$, $s_2$} are identified in an image X. We use a binary array B of length m=16 and k=3 hash functions {$h_0$, $h_1$, $h_2$} to store the 4 features as follows:

Step 1: Initialize B to all zeroes.

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |

Step 2: Suppose that $h_0(s_0)$=1, $h_1(s_0)$=2, $h_2(s_0)$=7. Set the corresponding positions in B to 1 to store $s_0$.

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 1 | 1 | 0 | 0 | 0 | 0 | 1 | 0 | 0 | 0 | 0 | 0 | 0 | 0 | 0 |

Step 3: Suppose that $h_0(s_1)$=9, $h_1(s_1)$=2, $h_2(s_1)$=D. Set the corresponding positions in B to 1 to store $s_1$.

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 1 | 1 | 0 | 0 | 0 | 0 | 1 | 0 | 1 | 0 | 0 | 0 | 1 | 0 | 0 |

Step 4: Suppose that $h_0(s_2)$=F, $h_1(s_2)$=7, $h_2(s_2)$=0. Set the corresponding positions in B to 1 to store $s_1$.

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 1 | 1 | 1 | 0 | 0 | 0 | 0 | 1 | 0 | 1 | 0 | 0 | 0 | 1 | 0 | 1 |

The resulting array B=1110 0001 0100 0101 is the summary representation of X.

In order to check if a feature t appears in X, one simply computes $h_0(t)$, $h_1(t)$, and $h_2(t)$. If $B[h_0(t)]$, $B[h_1(t)]$, and $B[h_2(t)]$ are all set to 1, then t appears in X (with a probability of being a false positive); otherwise it does not (with certainty).

In some solutions, the individual summary representations of N (N≥2) pictures is combined (binary OR of N binary vectors) to provide a single summary representation of the whole set. Specifically, let S'={$x_0$, ..., $x_{N-1}$} denote a set of N pictures (post expansion), and let $B_i$ denote the summary representation based on a bloom filter of $x_i$, i=0, ..., N−1. Then the summary representation of S' based on the same bloom filter is:

$$B_S = \Sigma_{i=0}^{N-1} B_i.$$

Note here the sum here can be logical for standard binary bloom filters or arithmetic for counting bloom filters or their variants. This feature may be particularly useful in applications where the feature/descriptor database might be dynamic. For example, when a new image with summary representation $B_N$ is added to the set S', $B_S$ can be efficiently updated by simply adding $B_N$ to $B_S$.

Tiered False Positives

In the above example, the parameters (m, k) remain constant for all n features, and thus the false positive probability is also a constant. However, in some implementations, it may be possible to provide for at least two different false positive probabilities. In some cases, the allowable false positive probability might be different for different features. For example, suppose that one knows a priori the probability $p_x$ of feature x, and that $p_x$ is not a constant. Let $\varepsilon_x$ denote the false positive probability of testing x. Then for a feature with high $p_x$, $\varepsilon_x$ might be required to be relatively low; and for a feature with low $p_x$, $\varepsilon_x$ can be relatively high. In other words, a balance of $p_x \varepsilon_x$ is to be maintained.

Another possible scenario is that the features are classified into more than one distinct classes of varying importance. For examples, some features extracted from background part of a picture might be considered less important than features extracted from foreground part of a picture. In this case, one might want to have different false positive probabilities for features in different classes.

In one embodiment, two concatenated bloom filters are used to achieve two distinct false positive probabilities. Let $\varepsilon_0$ denote a first false positive probability less than 1, and let $\varepsilon_1$ denote a second false positive probability, where $\varepsilon_1$ is a positive real number less than $\varepsilon_0$. Suppose there are n features to be stored, where the first n/2 features are expected to have a false positive probability $\varepsilon_0$ and the second n/2 "important" features are expected to have a false positive probability $\varepsilon_1$. The following two example bloom filters may be used to achieve the desired false positive probabilities.

The first bloom filter with parameters $(m_0, k_0)$ is designed to achieve $\varepsilon_0$ such that:

$$\left(1 - e^{-\frac{nk_0}{m_0}}\right)^{k_0} \leq \varepsilon_0.$$

One possible choice of $(m_0, k_0)$ is $$k_0 = \frac{m_0}{n} \ln 2.$$

The second bloom filter with parameters $(m_1, k_1)$ is designed to achieve $\varepsilon_1$ such that:

$$\left(1 - e^{-\frac{nk_1}{2m_1}}\right)^{k_1} \leq \frac{\varepsilon_1}{\varepsilon_0}.$$

One possible choice of $(m_1, k_1)$ is $$k_1 = \frac{2m_1}{n} \ln 2.$$

Note all n features are stored in the first bloom filter and only the second n/2 important features are stored in the second bloom filter.

In the testing step, a feature x is first checked against the first bloom filter. If it is determined that the feature x is present in the first bloom filter, and one would like to know whether the feature is an important feature, x is then checked against the second bloom filter. Thus, the false positive probability for the n/2 important features is the product of the false positive probability of the first bloom filter and that of the second bloom filter, i.e., $\varepsilon_1$.

In the above example, the subset of important features can be generalized to any positive integer less than n. Furthermore, the solution may be extended to accommodate z classes of features which are associated with 1 distinct false positive probabilities $\varepsilon_0 > \varepsilon_1 > \ldots > \varepsilon_{z-1}$, respectively. In the above, z is a positive integer. Specifically, one embodiment of the proposed solution concatenates z bloom filters, where the first bloom filter is designed to achieve the false positive probability $\varepsilon_0$, and the ith bloom filter, $1 \leq i \leq z$, is designed to achieve the false positive probability $$\frac{\varepsilon_{i-1}}{\prod_{j=0}^{i-2} \varepsilon_j}.$$

Applications—Fingerprints

In one example, feature expansion is used in fingerprint authentication.

Since fingerprints are subject to distortions in the acquisition process, it is difficult if not impossible to authenticate a fingerprint simply by examining the hash value of the enrolled fingerprint. Quantization and distance calculation are generally required at the time of authentication. However, in order to perform distance calculation, the enrolled fingerprint needs to be exposed, which might pose a security risk if the system is compromised: unlike a password, a compromised fingerprint cannot be simply replaced. By using feature expansion at the enrolment stage (set representation), it becomes possible to authenticate an input fingerprint simply by checking if its hash value matches an enrolled one. This is in contrast with the naïve application of hash functions, where there is only one hash value of the original enrolled fingerprint, and thus it is not possible to do approximate matching without accessing the enrolled fingerprint itself. Note that in one variant of the proposed solution, traditional hash tables are used instead of bloom filters to avoid false positives. When a bloom filter is indeed used, a process might be taken to eliminate false positives after the membership is verified by the bloom filter.

In an embodiment where hash tables are used, the enrolment process works as follows. Let F denote the fingerprint to be enrolled. Initialize an array T to all zeros and then carry out the following process:

First, perform the above-described feature expansion process to expand S={F} into an expanded set S'.

Second, for every member s in S', compute its hash value h(s) and determine its entry index in an array T, e.g. index=h(s) % n, where n is the length of T.

Third, store a constant, e.g., 1, in T[index]. Optionally, one can store a checksum c(s) of s in T[index].

When a fingerprint G is submitted for authentication, the following process may be used to authenticate the fingerprint:

First, compute the hash value h(G), and determine an index i=h(s) % n.

Second, if T[i]=1, declare a match is found; otherwise, reject G. Optionally, if a checksum is stored in T[i], compare it against the checksum c(G) of G. If the two checksums are the same, declare a match is found; otherwise reject G.

Applications—Visual Search

The above-described feature expansions process for searching may allow for shorter response time by facilitating some local search operations, rather than requiring that all search be carried out on a server. To perform local search on a device, the feature (descriptor) database needs to be available on the device, which might incur undue storage complexity. Though a bloom filter representation of the database might address the storage complexity problem, as discussed earlier it is however not amenable to distance calculation. By combining feature expansion and bloom filter representation, the proposed solution provides a viable solution to on-device local search, e.g., a bloom filter representation of a feature database after feature expansion, instead of the database itself, is made available on the local device.

In one example embodiment, local search works as follows. Device A sends a request to Server B requesting data for a local search. Optionally, the request from Device A includes information about δ indicating the distortion level to be tolerated. Upon receiving the request from A, Server B does the following:

(a) expands the available features according to the level δ decoded from the request or a default level if δ is not present in the request;
(b) determines the bloom filter parameters m and k according to the cardinality N of the expanded set and a prescribed false positive probability threshold ε;
(c) generates a binary array R of length m as the bloom filter representation of the expanded set by using k hash functions (note that the selection of the k hash functions follows a standard procedure known both to Device A and Server B);
(d) sends a response to Device A that contains the following information: the array R and the bloom filter parameters (m, k).

Upon receiving the array and the bloom filter parameters, Device A may then perform the following operations:

(e) decode the parameters (m, k) and select the same k hash functions (following the same procedure as was used by Server B); and
(f) search for a feature s locally using the array R and the k hash functions, i.e. compute the hash values of s by using each of the k hash functions and checking whether the entries in R at the positions identified by the hash values are all set. If the answer is yes, s is available at Server B; otherwise, s is not available at Server B.

In some embodiments, Server B may carry out operations (a), (b), and (c) offline for a range of level in order to respond more quickly to queries from remote devices.

Applications—Health Record Management

The privacy of health records is of primary importance, so mechanisms for searching databases of health records are desirable. In the above-described feature expansion process, hash value matching is used to find search results without revealing the original contents of the database, even if the contents are subject to distortions.

One example is to link health record based on names and birthdates. If the database contains records relating to the same person, the birthdate should be exactly the same but the name might be spelled differently (e.g. Erdos and Erdös). Consequently, traditional hash-based privacy preserving approaches might apply to the birthdates, but are not directly applicable to the names. By using feature expansion as described above, it then becomes possible to use match hash values of (name, birthdate) pairs by membership testing.

Applications—MPEG CDVA

MPEG 7 Part 13 is directed to standardizing image descriptors (CDVS), with the purpose of enabling efficient and interoperable visual search applications. In addition to CDVS, MPEG is exploring compact descriptors for video analysis (CDVA). Descriptors in CDVS and CDVA are in essence quantized and compressed features extracted from image and video data.

Both CDVS and CDVA currently store individual descriptors and do not offer an efficient membership testing mechanism, i.e. to check if a descriptor is in a picture or not. Note that in some applications, given a picture, one might be interested only in the number of descriptors extracted from the picture that match those in the stored database or in another picture. In these applications, membership testing is sufficient. Furthermore, in applications that do require individual comparison of descriptors, membership testing may still be useful in avoiding expensive operations (e.g. data transmission over wireless links) on descriptors that are not in the database. One immediate application of the above-proposed solution to CDVS and CDVA is in defining a summary representation of descriptors in a picture as described above. Having a standardized summary representation will facilitate interoperability: for example, the participating parties do not need to negotiate the bloom filter parameters like the size m of the bit array, the number k of the hash functions, and the k hash functions used to populate the array, along with the maximum allowable distance δ in cases where approximate matching is used.

Note that the summary representations of two or more pictures might be combined, as described above. This feature could be useful in CDVS and CDVA in determining whether new descriptors should be added to a database. For example, one can quickly determine whether a descriptor has been seen before or not in two images with summary representations $B_1$ and $B_2$, respectively, by verifying against $B_1+B_2$ instead of verifying against $B_1$ and $B_2$ separately.

Summary representations in the MPEG format may be implemented as a binary array representing a set of image descriptors, where each descriptor is represented by setting k bins in the array to 1, and the positions of the k bins are selected according to the k hash values of the descriptor, respectively. The CDVS descriptor field may incorporate a flag to indicate whether a summary representation is present and, if so, the number of hash functions, the length of the summary representation, and the summary representation (the array) itself.

Below, is an example process for generating a summary representation in the case of CDVS encoding:

First, the number k of hash functions and the length m (in bytes) of the summary representation may be determined according to a ModelID value or using some other mechanism.

Second, initialize an all-zero binary vector B with length 8×n. Denote NumberOfHashFunctions by H, SummaryRepresentationLength by m, and NumberOfLocalDescriptors by N.

Third, identify the set S of N local descriptors, extracted from the original image. Suppose that S is ordered, i.e., $S=\{s_0, s_1, \ldots, s_{N-1}\}$. For each $k=0, \ldots, N-1$, determine a set $V_k$ as follows:

1. Initialize $V_k=\{s_k\}$, and $(i, j)=(0, 0)$.
2. Let $e_{k,i,j}$ denote the jth element in the ith cell in $s_k$. Do the following.
   a. If $e_{k,i,j}=-1$ and ${}^iQL_j(1-\in_{i,j})<e_{k,i,j}\le {}^iQL_j$, then construct s from $s_k$ by replacing $e_{k,i,j}$ with 0.
   b. If $e_{k,i,j}=+1$ and ${}^iQH_j<e_{k,i,j}\le {}^iQH_j(1+\in_{i,j})$, then construct s from $s_k$ by replacing $e_{k,i,j}$ with 0.
   c. If $e_{k,i,j}=0$ and ${}^iQL_j<e_{k,i,j}\le {}^iQL_j(1+\in_{i,j})$, then construct s from $s_k$ by replacing $e_{k,i,j}$ with −1.
   d. If $e_{k,i,j}=0$ and ${}^iQH_j(1-\in_{i,j})<e_{k,i,j}\le {}^iQH_j$, then construct s from $s_k$ by replacing $e_{k,i,j}$ with +1.
3. Insert s from Step 2 above into $V_k$, and increment j by 1.
4. Repeat Steps 2-3 until all elements in $s_k$ are processed. Let $S'=\cup_{i=1}^{N-1}V_k$, and let N' denote the cardinality of S'. Compute $$H = \left\lfloor 5.5452\frac{m}{N'} + 0.5 \right\rfloor.$$

In the above, ${}^iQL_j$ and ${}^iQH_j$ are defined by the MPEG standard, and $\in_{i,j}$ is a small number in (0, 1).

Then the vector B is populated as follows.

```
for (k=0; k < N'; k++)
{
    for(h=0; h < H; h++)
    {
        p = HashFunc(s_k, h) mod m;
        B[p] = 1;
    }
}
```

In the above, HashFunc(s, j) computes the hash value of s by using the jth Hash function. The Hash functions may be pre-defined by the MPEG standard.

It will be appreciated that the processes and systems according to the present application may be implemented in a number of computing devices, including, without limitation, servers, suitably-programmed general purpose computers, and mobile devices. The processes may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the devices described herein and the module, routine, process, thread, or other software components implementing the described methods/processes may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of constructing a search system, the search system having a set of data points, wherein the set of data points includes image or video descriptors, the method comprising:
    determining a threshold error;
    expanding the set to create an expanded set by,
        initializing the expanded set to include all data points from the set as data elements of the expanded set, and
        for every data point in the set, finding all data elements within an error distance of that data point and adding those found data elements to the expanded set, wherein the error distance is a function of the threshold error;
    creating a first summary representation of the expanded set by constructing a binary array using a plurality of hash functions as a bloom filter;
    storing the binary array in the search system as the first summary representation of the expanded set for evaluating future search queries, wherein the first summary representation relates to a first picture and wherein the search system stores a second summary representation relating to a second picture; and
    summing the first and second summary representations to create and store a composite summary representation.

2. The method claimed in claim 1, further comprising selecting a scalar quantizer, wherein expanding the set includes first quantizing the data points in the set of data points.

3. The method claimed in claim 1, further comprising storing the expanded set in memory for future searching.

4. The method claimed in claim 1, wherein the error distance comprises one of L1 distance, L2 distance, editing distance, earth moving distance, KL divergence, and structural similarity.

5. The method claimed in claim 1, wherein the determining, expanding and creating operations are performed at least twice for distinct threshold error value to produce corresponding binary arrays, each of which is stored in the search system for use in responding to future search queries.

6. The method claimed in claim 1, further comprising:
    receiving a query; and
    applying the plurality of hash functions to the query to determine, from the binary array, whether the query matches one of the data elements in the expanded set and, if so, outputting a match.

7. The method claimed in claim 1, wherein constructing a binary array comprises:
    classifying the data elements of the expanded set into one of two classes;
    applying a first bloom filter to all data elements of the expanded set to create a first binary array; and
    applying a second bloom filter to data elements of one of the classes but not to data elements of the other of the classes, to create a second binary array,
    wherein the first bloom filter has a higher false positive probability than the second bloom filter.

8. The method claimed in claim 1, wherein the summing is a logical sum if the bloom filter is a standard binary bloom filter and is an arithmetic sum if the bloom filter is a counting bloom filter or its variants.

9. The method claimed in claim 1, wherein storing the binary array in the search system as the first summary representation of the expanded set comprises storing the first summary representation as part of a compact descriptors for visual search (CDVS) descriptor associated with an image or video, and wherein the CDVS descriptor includes a field having a flag to indicate that the first summary representation is present in the CDVS descriptor.

10. A search system for non-identical feature matching, the search system comprising:
    one or more processors;
    memory storing a set of data points and a threshold error, wherein the set of data points includes image or video descriptors; and
    processor-executable search instructions that, when executed by the one or more processors cause the one or more processors to:
        expand the set to create an expanded set by,
            initializing the expanded set to include all data points from the set as data elements of the expanded set, and
            for every data point in the set, finding all data elements within an error distance of that data point and adding those found data elements to the expanded set, wherein the error distance is a function of the threshold error,
        create a first summary representation of the expanded set by constructing a binary array using a plurality of hash functions as a bloom filter;
        store the binary array in the memory as the first summary representation of the expanded set for evaluating future search queries, wherein the first summary representation relates to a first picture and wherein the search system stores a second summary representation relating to a second picture; and sum the first and second summary representations to create and store a composite summary representation.

11. The search system claimed in claim 10, further comprising instructions that, when executed by the one or more processors cause the one or more processors to select a scalar quantizer, wherein expanding the set includes first quantizing the data points in the set of data points.

12. The search system claimed in claim 10, further comprising instructions that, when executed by the one or more processors cause the one or more processors to store the expanded set in memory for future searching.

13. The search system claimed in claim 10, wherein the error distance comprises one of L1 distance, L2 distance, editing distance, earth moving distance, KL divergence, and structural similarity.

14. The search system claimed in claim 10, wherein the determining, expanding and creating operations are performed at least twice for distinct threshold error value to produce corresponding binary arrays, each of which is stored in the memory for use in responding to future search queries.

15. The search system claimed in claim 10, further comprising instructions that, when executed by the one or more processors cause the one or more processors to receive a query; and apply the plurality of hash functions to the query to determine, from the binary array, whether the query matches one of the data elements in the expanded set and, if so, outputting a match.

16. The search system claimed in claim 10, wherein the instructions cause the processor to construct the binary array by:

classifying the data elements of the expanded set into one of two classes;

applying a first bloom filter to all data elements of the expanded set to create a first binary array; and applying a second bloom filter to data elements of one of the classes but not to data elements of the other of the classes, to create a second binary array, wherein the first bloom filter has a higher false positive probability than the second bloom filter.

17. The search system claimed in claim 10, wherein the summing is a logical sum if the bloom filter is a standard binary bloom filter and is an arithmetic sum if the bloom filter is a counting bloom filter or its variants.

18. The search system claimed in claim 10, wherein the instructions cause the processor to store the binary array in the memory by storing the first summary representation as part of a compact descriptors for visual search (CDVS) descriptor associated with an image or video, and wherein the CDVS descriptor includes a field having a flag to indicate that the first summary representation is present in the CDVS descriptor.

19. A non-transitory processor-readable medium storing processor-executable instructions for constructing a search system, the search system having a set of data points and a threshold error, wherein the set of data points includes image or video descriptors, and wherein the instructions, when executed, cause one or more processors to:

expand the set to create an expanded set by, initializing the expanded set to include all data points from the set as data elements of the expanded set, and for every data point in the set, finding all data elements within an error distance of that data point and adding those found data elements to the expanded set, wherein the error distance is a function of the threshold error, create a first summary representation of the expanded set by constructing a binary array using a plurality of hash functions as a bloom filter;

store the binary array in the memory as the first summary representation of the expanded set for evaluating future search queries, wherein the first summary representation relates to a first picture and wherein the search system stores a second summary representation relating to a second picture; and sum the first and second summary representations to create and store a composite summary representation.

* * * * *